(12) United States Patent
Peters et al.

(10) Patent No.: US 9,884,359 B2
(45) Date of Patent: Feb. 6, 2018

(54) ADJUSTABLE TWIST BEAM TUBE FORMING DIE

(71) Applicant: MAGNA INTERNATIONAL INC., Aurora, Ontario (CA)

(72) Inventors: Christopher Erik Peters, Guelph (CA); Scott Robert Mooney, Fergus (CA)

(73) Assignee: Magna International Inc., Aurora, Ontario (CA)

( * ) Notice: Subject to any disclaimer, the term of this patent is extended or adjusted under 35 U.S.C. 154(b) by 460 days.

(21) Appl. No.: 14/407,589

(22) PCT Filed: Jun. 14, 2013

(86) PCT No.: PCT/CA2013/000564
§ 371 (c)(1),
(2) Date: Dec. 12, 2014

(87) PCT Pub. No.: WO2013/185212
PCT Pub. Date: Dec. 19, 2013

(65) Prior Publication Data
US 2015/0151352 A1    Jun. 4, 2015

Related U.S. Application Data

(60) Provisional application No. 61/660,214, filed on Jun. 15, 2012.

(51) Int. Cl.
*B21D 53/88*    (2006.01)
*B60G 21/05*    (2006.01)
*B21D 22/02*    (2006.01)

(52) U.S. Cl.
CPC .......... *B21D 53/88* (2013.01); *B21D 22/025* (2013.01); *B60G 21/051* (2013.01);
(Continued)

(58) Field of Classification Search
CPC ...... B21D 22/025; B21D 37/00; B21D 37/02; B21D 37/10; B60G 2206/0122; B60G 2206/202; B60G 2206/012
See application file for complete search history.

(56) References Cited

U.S. PATENT DOCUMENTS 3,987,721 A     10/1976   Alexander et al.
2007/0000973 A1  1/2007   Johnson et al.
(Continued)

FOREIGN PATENT DOCUMENTS

JP    2006289392 A    10/2006
KR    20060020245 A    3/2006
(Continued)

*Primary Examiner* — Christopher Besler
(74) *Attorney, Agent, or Firm* — Dickinson Wright PLLC

(57) ABSTRACT

A die 20 used to form a metal tube into a tubular twist beam part 22 having a U-shaped torsion section 66 is provided. The die 20 includes a punch 44 and side form blocks 34 which simultaneously engage a metal tube and form the metal tube into the tubular twist beam part 22. The form blocks 34 have a curved profile which depends on the desired profile of the tubular twist beam part 22 to be formed. The die 20 includes horizontal spacer blocks 38 and vertical spacer blocks 32 restricting movement of the punch 44 and form blocks 34. The spacer blocks 32, 38 can have various different dimensions and can be easily removed and replaced to adjust the closing position of the die 20 and thus form multiple tubular twist beam parts 22 each having a different dimension and different roll rate.

7 Claims, 9 Drawing Sheets

(52) U.S. Cl.
CPC .... *B60G 2200/23* (2013.01); *B60G 2206/012* (2013.01); *B60G 2206/202* (2013.01); *Y10T 29/49622* (2015.01)

(56) References Cited

U.S. PATENT DOCUMENTS

2009/0071220 A1\* 3/2009 Gillet ................ B21D 22/025
          72/372
2009/0301163 A1  12/2009 Hallfeldt et al.
2010/0187788 A1   7/2010 Choi et al.
2010/0301577 A1  12/2010 Toepker

FOREIGN PATENT DOCUMENTS

| KR | 100848667 B1 | 7/2008 |
| KR | 20110035091 A | 4/2011 |
| WO | 9808633 A1 | 3/1998 |

\* cited by examiner

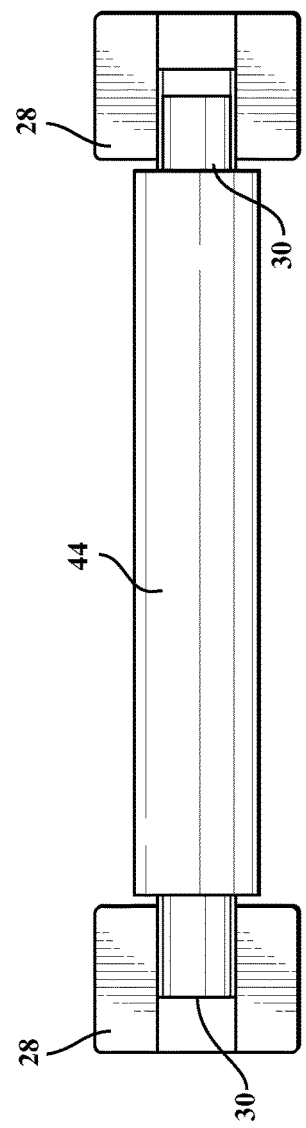
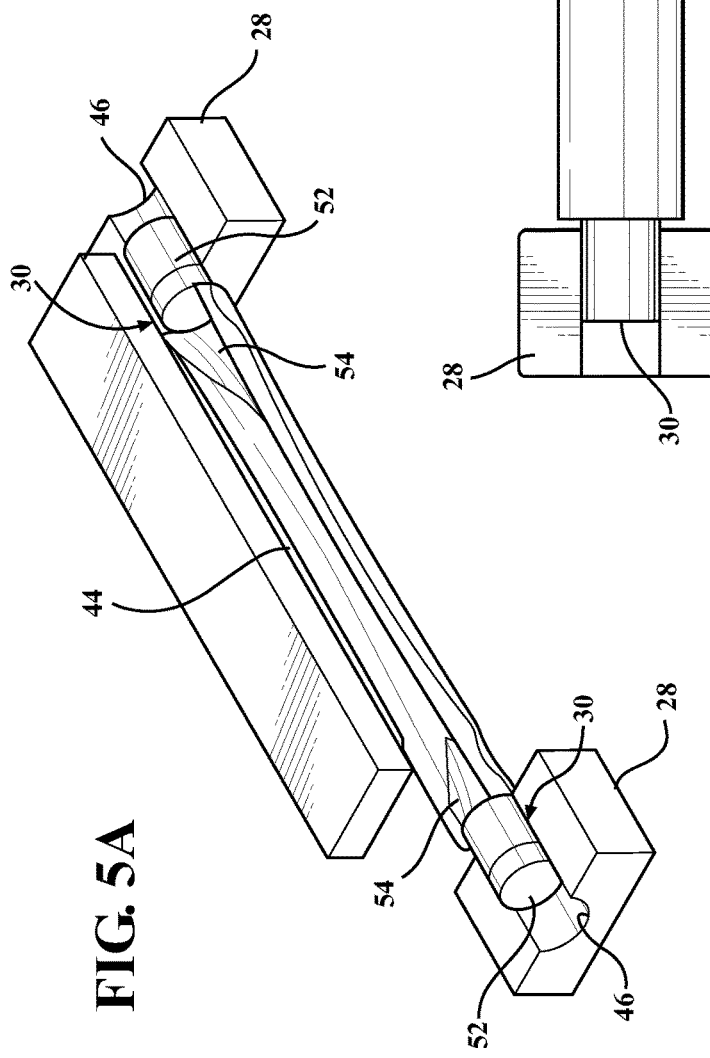
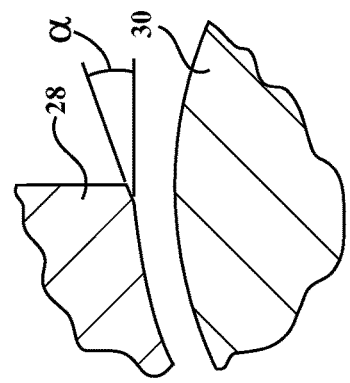
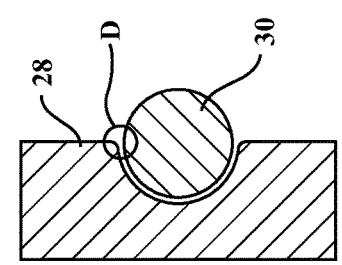

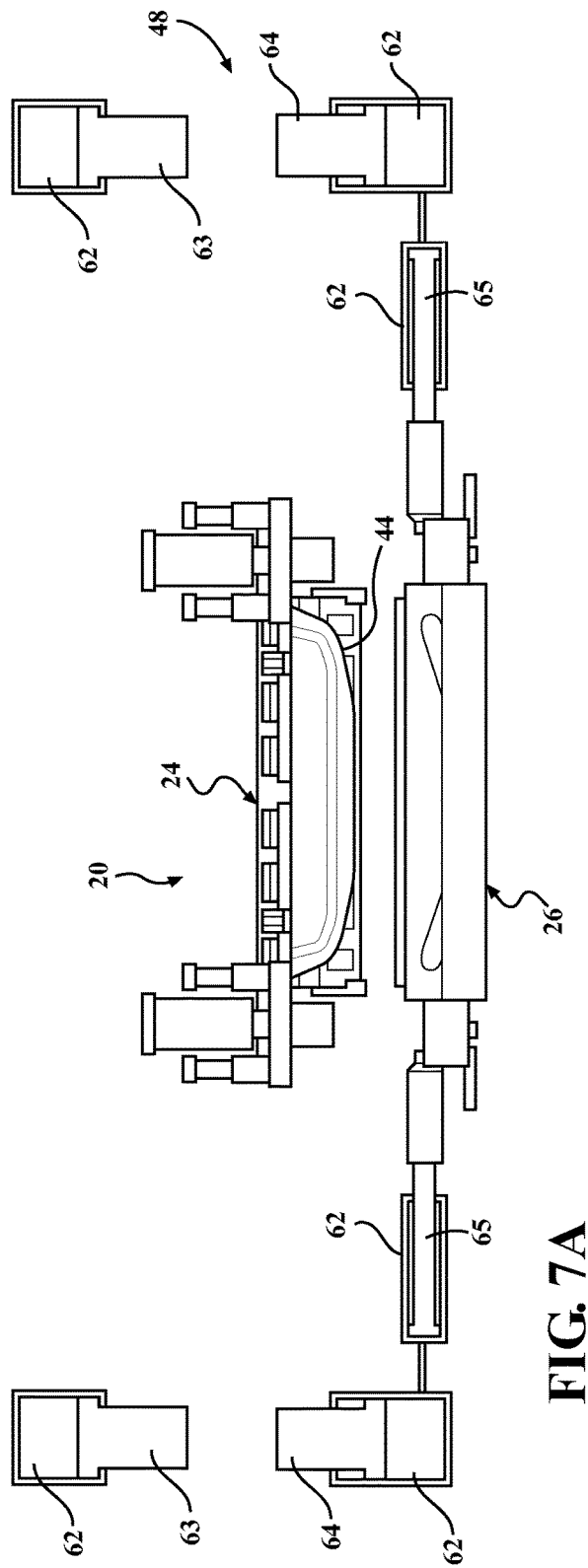
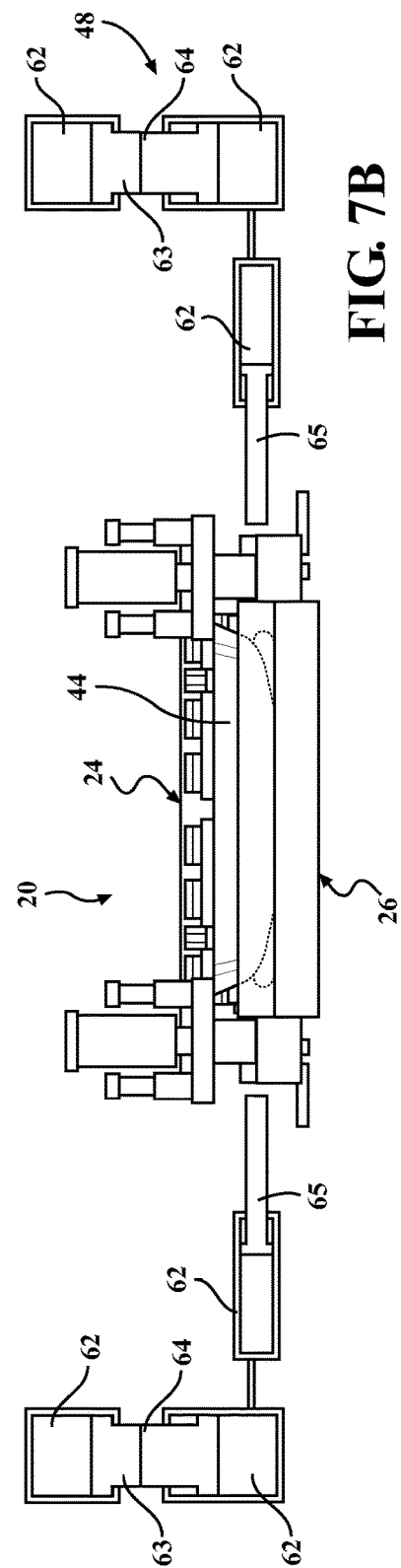
FIG. 7A
FIG. 7B

ADJUSTABLE TWIST BEAM TUBE FORMING DIE

CROSS REFERENCE TO RELATED APPLICATIONS

This U.S. National Stage Patent Application claims priority to PCT International Application No. PCT/CA2013/000564 filed Jun. 14, 2013, entitled "Adjustable Twist Beam Tube Forming Die" which claims the benefit of U.S. Provisional Patent Application Ser. No. 61/660,214, entitled "Adjustable Twist Beam Tube Forming Die", filed Jun. 15, 2012, the entire disclosures of the applications being considered part of the disclosure of this application, and hereby incorporated by reference.

BACKGROUND OF THE INVENTION

1. Field of the Invention

The subject invention relates to dies used to form tubular twist beam parts, and methods of forming tubular twist beam parts.

2. Related Art

Automotive vehicles include twist beam axles, also referred to as twist beam parts or twist axle parts, for connecting control arms in a twist suspension system. A twist beam axle extends between rear wheels of the vehicle and provides a means of packaging the suspension while minimizing intrusion into the passenger compartment. The twist beam axle may comprise an H-shaped, C-shaped, U-shaped, or V-shaped bar formed of a metal material.

The twist beam axle may also comprise a tubular twist beam part, which is formed by pressing or molding a tube into a predetermined shape. The tubular twist beam part is not only a structural member, but also acts as a torsion spring. An example of a tubular twist beam part is disclosed in U.S. Patent Application Publication No. 2010/0301577. The weight of the tubular twist beam part is preferably low since it contributes to the total weight of the automotive vehicle. However, tubular twist beam parts experience a significant amount stress due to twisting and other factors. Therefore, maximum stress levels, especially those due to twisting, dictate the material thickness and the weight of the tubular twist beam part.

The tubular twist beam part is also used to control a roll rate of the vehicle, which affects the ride and handling of the vehicle. The roll rate is analogous to a vehicle's ride rate, but for actions that include lateral accelerations, causing a vehicle's sprung mass to roll. Roll rate is expressed as torque per degree of roll of the vehicle sprung mass, and is typically measured in Nm/degree. The roll rate of a vehicle does not change the total amount of weight transfer on the vehicle, but shifts the speed at which and percentage of weight transferred on a particular axle to another axle through the vehicle chassis. Generally, the higher the roll rate on an axle of a vehicle, the faster and higher percentage the weight transfer on that axle. A slower weight transfer reduces the likelihood of vehicle rollover conditions. The dimensions and design of the tubular twist beam part have a significant influence on the roll rate of the vehicle.

The tubular twist beam parts are formed using dies and other tools. Oftentimes, multiple dies or tools and three separate forming steps are needed to form a tubular twist beam part with dimensions providing the desired roll rate, which is costly and time consuming. In order to achieve a new roll rate, or to "tune" the roll rate of a particular part, the die or tools must be re-designed, which is costly and may take weeks or months. Further, to manufacture multiple parts each providing a different roll rate, different dies and tools must be designed and employed, which is also costly and time consuming.

SUMMARY OF THE INVENTION

The invention provides an adjustable die for manufacturing tubular twist beam parts of various different dimensions. The adjustable die comprises an upper half including a punch extending between opposite ends and having a convex profile for engaging a metal tube. The upper half also includes a pair of upper cassettes, wherein each upper cassette provides a groove and is disposed along one end of the punch. The grooves of the upper cassettes are axially aligned with one another and provide an axial location for the metal tube. The adjustable die further comprises a lower half including a pair of lower cassettes vertically aligned with the upper cassettes. Each lower cassette provides a groove, and the grooves of the lower cassettes are axially aligned with one another and face the grooves of the upper cassettes. The lower half also includes a pair of form blocks disposed on opposite sides of the punch. The form blocks move toward one another and engage opposite sides of the metal tube. The lower half also includes a pair of side cams disposed on opposite sides and outwardly of the form blocks. The side cams press the form blocks toward one another and toward the metal tube. The adjustable die further includes at least one of a vertical spacer block and a pair of horizontal spacer blocks. The vertical spacer block extends between the upper half and lower half for restricting movement of the upper half toward the lower half. Each horizontal spacer block is disposed between one of the lower cassettes and the adjacent form block for restricting movement of the adjacent side cam toward the form block. The vertical spacer block and the horizontal spacer blocks are removable and replaceable with a vertical spacer block and a pair of horizontal spacer blocks of a different dimension.

The invention also provides a method of forming a plurality of tubular twist beams having various different dimensions using the adjustable die with the vertical spacer block, the horizontal spacer blocks, or both. When the adjustable die includes the vertical spacer block, the method includes disposing a first metal tube between the lower cassettes; and moving the upper half toward the lower half and engaging the first metal tube with the punch to form a first tubular twist beam part. The vertical spacer block restricts movement of the upper half toward the lower half.

The invention provides another method of forming a plurality of tubular twist beam parts having various different dimensions using the horizontal spacer blocks. The method comprises the steps of disposing a first metal tube between the lower cassettes, moving the upper half toward the lower half, and engaging the first metal tube with the punch. The method also includes moving the side cams toward one another and engaging the first metal tube with the form blocks to form a first tubular twist beam part. The horizontal spacer blocks restrict movement of the side cams toward one another.

The vertical and horizontal spacer blocks adjust the closing position of the die so that the metal tube can be formed into dimensions providing the desired roll rate. Further, the spacer blocks can be replaced with spacer blocks having different dimensions to adjust the roll rate of the tubular twist beam parts. Therefore, the die of the present invention is capable of forming multiple tubular twist beam parts each having a different dimension and a different roll rate. The die is also capable of quickly and conveniently tuning the dimensions and thus the roll rate of a tubular twist beam part in production. Accordingly, there is no need to design a new die when a new roll rate is needed. Further, the die is capable of forming a metal tube into a tubular twist beam part with only one press stroke, and does not require additional forming tools or steps.

BRIEF DESCRIPTION OF THE DRAWING

Other advantages of the present invention will be readily appreciated, as the same becomes better understood by reference to the following detailed description when considered in connection with the accompanying drawing wherein:

FIG. 5A is a perspective view of a portion of the upper die and lower die showing the lower cassettes according to an embodiment of the invention;

FIG. 5B is a top view of FIG. 5A;

FIG. 5C is a side view of a portion of FIG. 5B;

FIG. 5D is an enlarged cross-sectional view of a portion of FIG. 5C

FIG. 7A illustrates an insertion/retraction system used to install mandrels in the die when the die is open;

FIG. 7B illustrates an insertion/retraction system when the die is closed;

DETAILED DESCRIPTION

Figure 1:
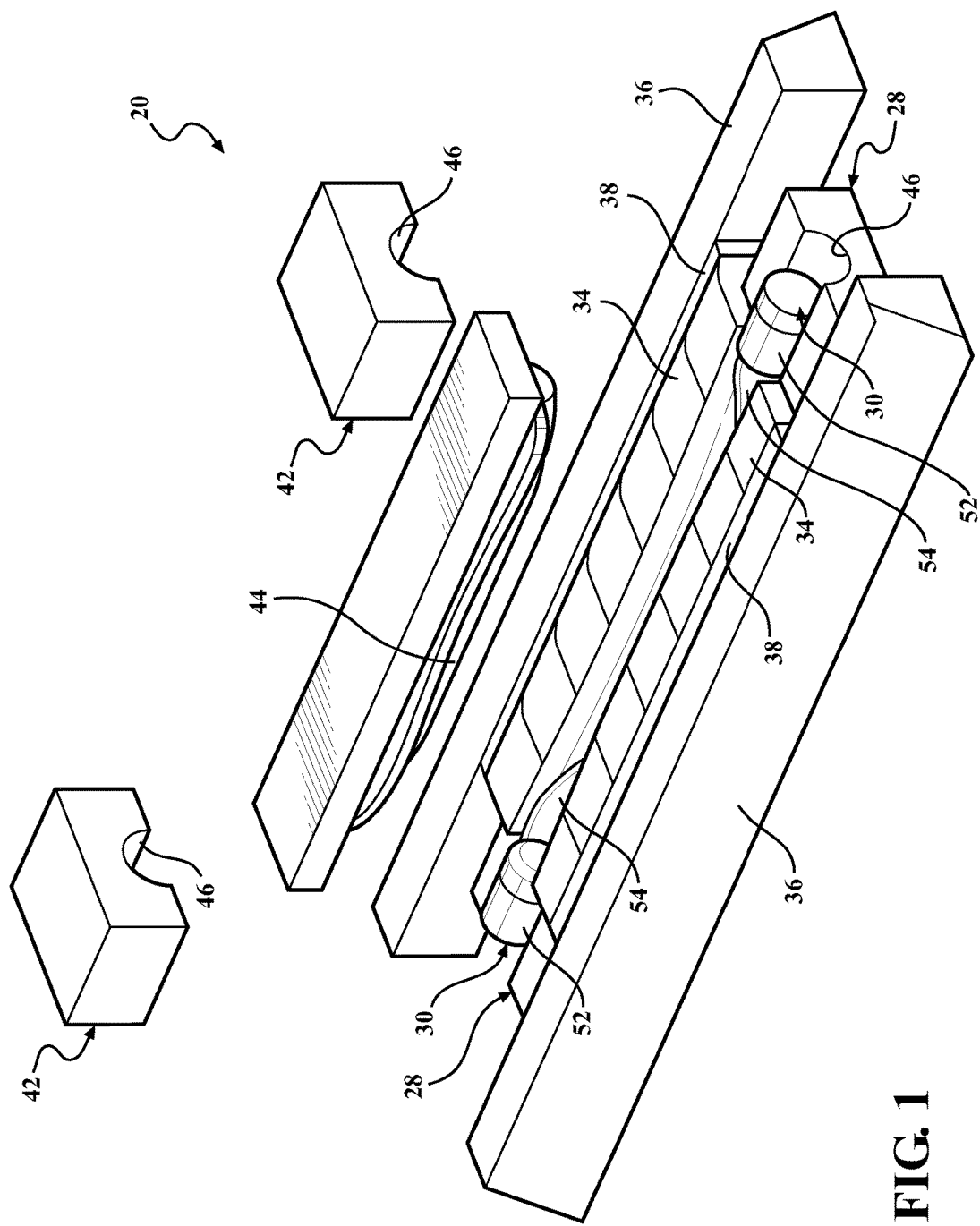
FIG. 1 is a perspective view of a die used to form a tubular twist beam part according to an embodiment of the invention.
Figure 2:
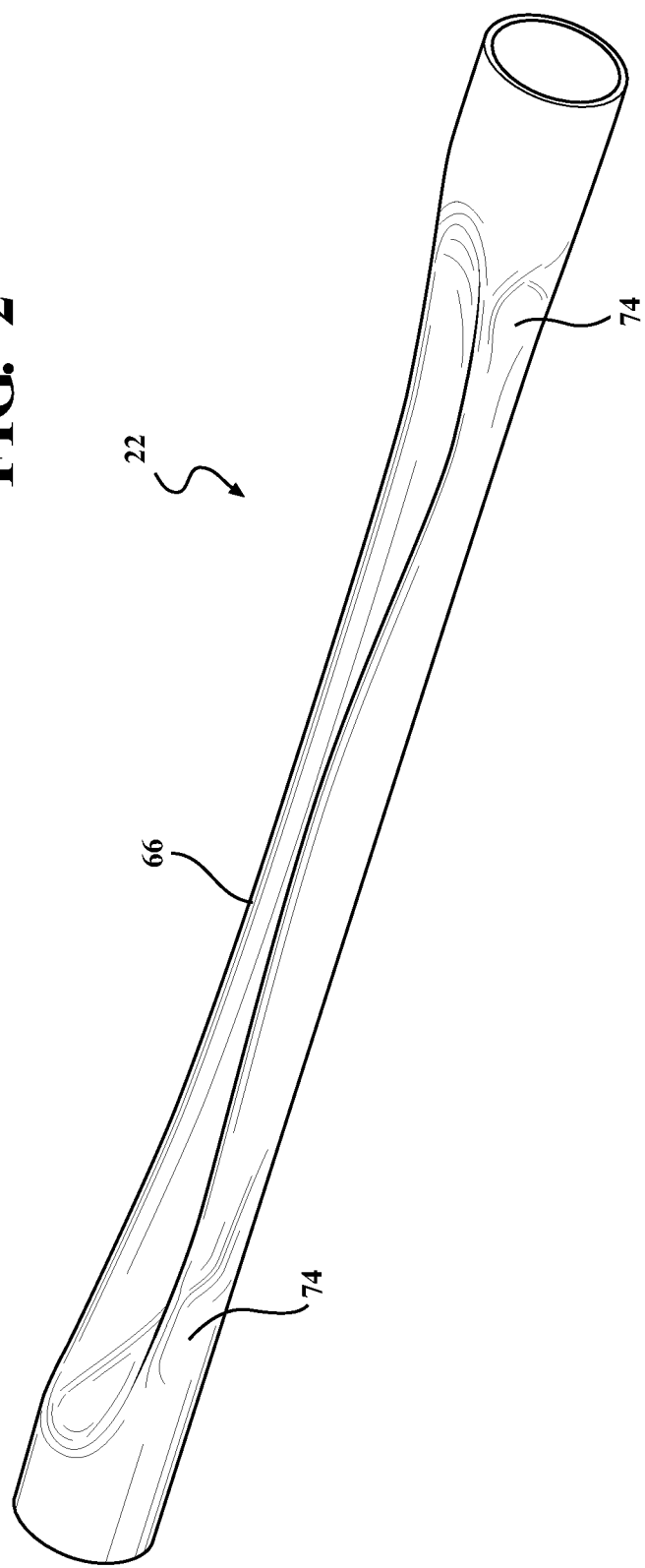
FIG. 2 is a perspective view of an exemplary tubular twist beam part formed by the die of FIG. 1.
Figure 3:
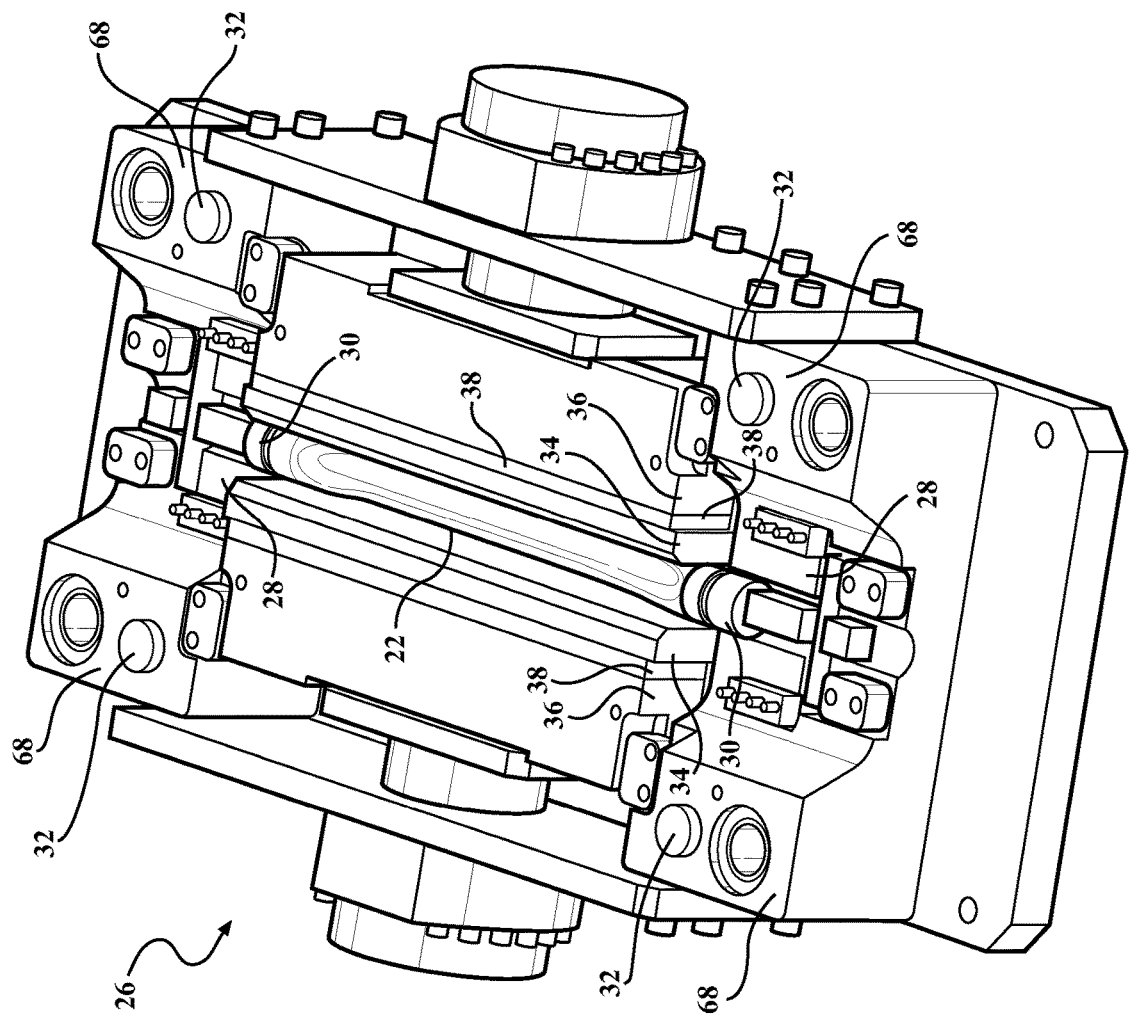
FIG. 3 is a perspective view of a lower half of a die used to form the tubular twist beam part according to another embodiment of the invention.
Figure 4:
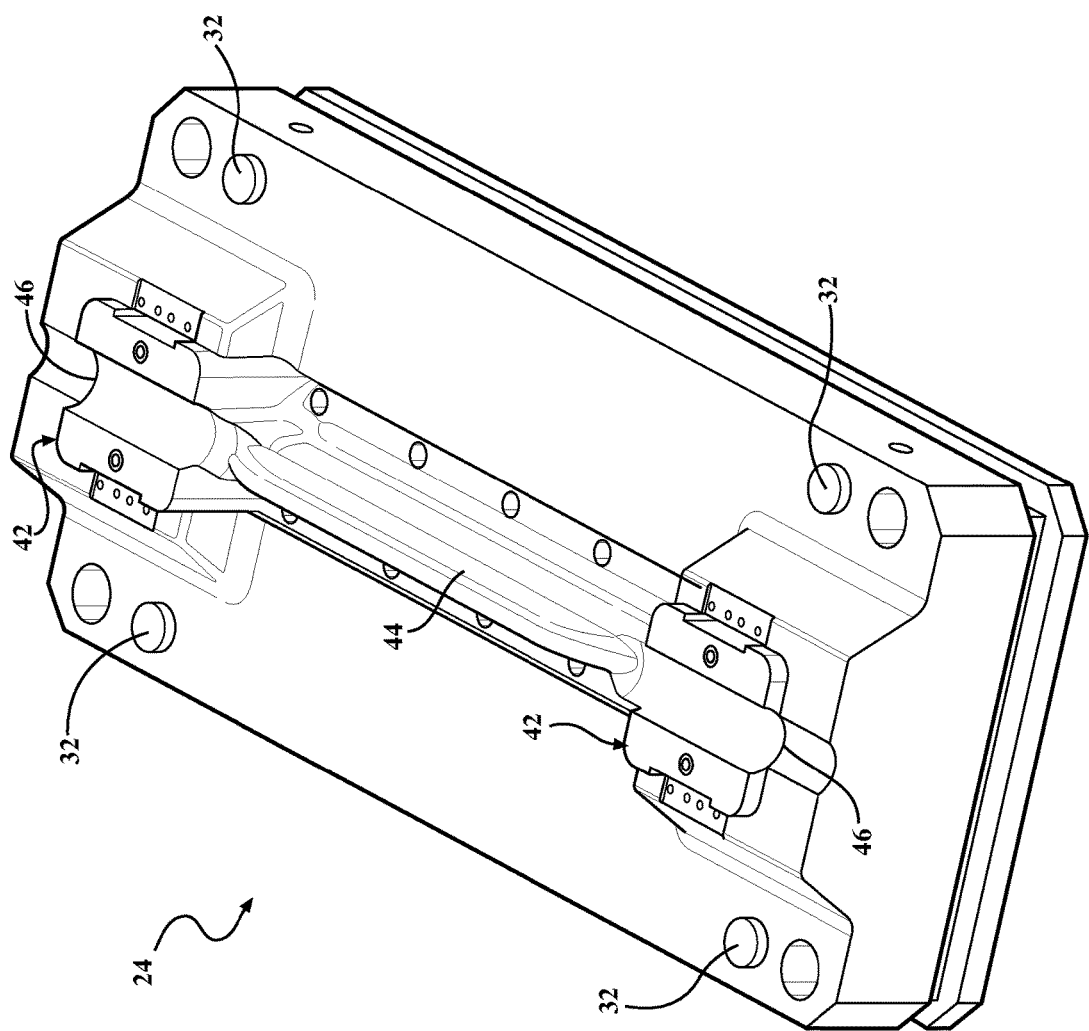
FIG. 4 is a perspective view of an upper half of the die of FIG. 3.

An exemplary die 20 used to form a metal tube into a tubular twist beam part 22 is shown in FIG. 1. An exemplary tubular twist beam part 22 including a U-shaped torsion section 66 formed by the die 20 is shown in FIG. 2. The die 20 typically includes a lower half 26 including lower cassettes 28, left hand and right hand mandrels 30, form blocks 34, side cams 36, and a pair of horizontal spacer blocks 38, as shown in FIG. 3; and an upper half 24 including upper cassettes 42 and a punch 44, as shown in FIG. 4. The die also typically includes vertical spacer blocks 32 connected to the upper half 24, the lower half 26, or both the upper half 24 and lower half 26, as shown in FIGS. 3 and 4. The form blocks 34 and punch 44 move toward one another and simultaneously engage the metal tube to form the metal tube into the tubular twist beam part 22. The profile of the punch 44 and the profile of the form blocks 34 are designed to achieve a desired profile along the tubular twist beam part 22 to be formed. The components of the die 20 may be formed of 22MnB5 or another metal material.

Figure 6:
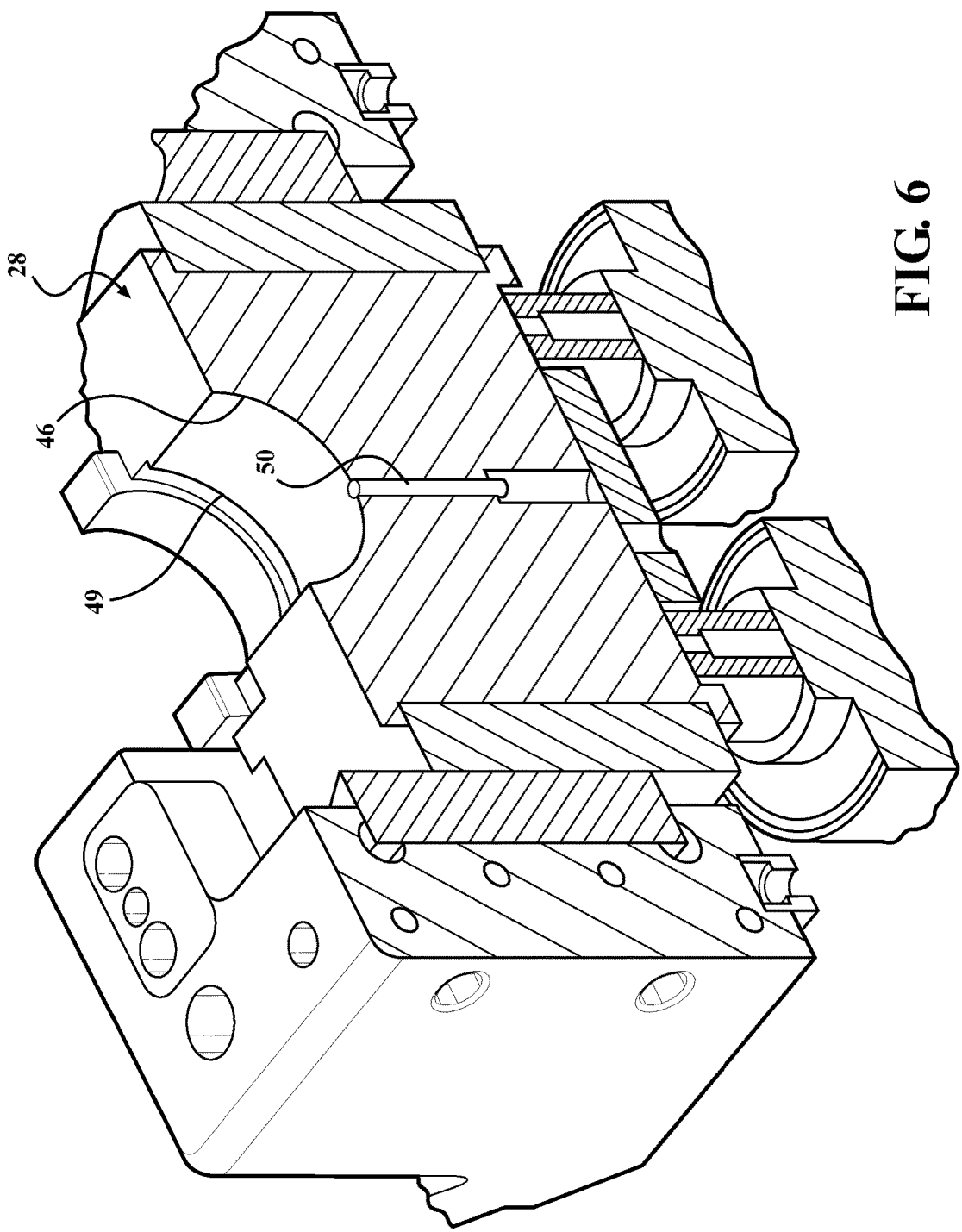
FIG. 6 illustrates a spring loaded pin in a lower cassette according to an embodiment of the invention.

The lower half 26 of the die 20 includes a pair of the lower cassettes 28 spaced from one another along an axis, as shown in FIGS. 1, 5A, and 5B. Each lower cassette 28 includes a U-shaped groove 46, as shown in FIG. 5C, and the U-shaped grooves 46 are aligned with one another to provide an axial location for the mandrels 30 and the metal tube. A robot or transfer system may be used to place the metal tube between or on the lower cassettes 28. As shown in FIG. 5D, the upper edges of the U-shaped groove 46 can be chamfered to present an angle α between the lower cassette 28 and a line parallel to the outer circumferential surface of the mandrel 30 or the outer circumferential surface of the metal tube, to prevent the mandrel 30 or finished tubular twist beam part 22 from sticking to the lower cassettes 28. The angle α is preferably about 10 degrees. A shallow end stop 49 can also be formed in each U-shaped groove 46, as shown in FIG. 6.

The left hand and right hand mandrels 30 are disposed in the U-shaped grooves 46 of the lower cassettes 28. The mandrels 30 support the ends of the metal tube and prevent the inside of the tube from collapsing during the forming process. Each mandrel 30 has a cylindrical portion 52 and a conical portion 54. FIG. 5A illustrates an example of the cylindrical portion 52 and a conical portion 54 of the mandrels 30 disposed on the bottom half of the metal tube. The cylindrical portion 52 is disposed in the U-shaped groove 46 of the lower cassette 28, and the conical portion 54 tapers gradually from the cylindrical portion 52 toward the center of the die 20. The conical portion 54 of the mandrel 30 is tapered to prevent the inside of the metal tube from sticking to the mandrel 30. The left hand and right hand mandrels 30 can have a variety of different diameters, depending on the diameter of the metal tube. The mandrels 30 can be easily inserted into the lower cassettes 28 or retracted from the lower cassettes 28. Accordingly, different mandrels 30 having various different dimensions may be used, depending on the diameter of the metal tube. The mandrels 30 also include hollow centers so that if the die 20 crashes during the setup or forming process, the mandrels 30 break and prevent damage to other components.

The left hand and right hand mandrels 30 can be inserted into the die 20 by various different methods. For example, the left hand and right hand mandrels 30 can be inserted into and retracted from the die 20 by an insertion/retraction system 48, which is separate from the die 20, as shown in FIGS. 7A and 7B. The insertion/retraction system 48 includes a plurality of driver cylinders 63, 64, 65 each with a nitrogen spring 62. The first driver cylinder 63 presses down on the second driver cylinder 64 causing the second driver cylinder 63 to press the third driver cylinder 65 toward the die 20, and the third driver cylinder 65 places the mandrel 30 on the lower cassette 28. Alternatively, other types of hydraulic cylinders or hydrocams can be used to inert the mandrels 30 into the die 20. In the event of a crash while inserting the mandrels 30 into the die 20, the mandrels 30 will break due to the hollow centers, which prevents damage to the insertion/retraction system 48.

In one embodiment, small spring loaded pins 50 extend through the base of the U-shaped groove 46 to space the mandrels 30 or metal tube from the lower cassettes 28 during the forming process and prevent the mandrels 30, metal tube, or finished tubular twist beam part 22 from sticking to the lower cassettes 28. The spring loaded pins 50 typically travel 1 mm outward of the lower cassettes 28. FIG. 6 shows an example of the spring loaded pin 50 extending through one of the lower cassettes 28.

The upper half 24 of the die 20 includes a pair of the upper cassettes 42 vertically aligned with the lower cassettes 28 and horizontally aligned with one another, as shown in FIG. 1. Each upper cassette 42 also includes a U-shaped groove 46, and the U-shaped grooves 46 are aligned with one another to provide an axial location for the mandrels 30 and the metal tube. The upper edges of the U-shaped groove 46 can be chamfered, just like the lower cassettes 28, to prevent the mandrel 30, metal tube or finished tubular twist beam part 22 from sticking to the upper cassette 42.

The upper half 24 also includes the punch 44 extending longitudinally between the upper cassettes 42. The punch 44 and the form blocks 34 travel toward one another and simultaneously engage the metal tube to form the metal tube into the tubular twist beam part 22. The punch 44 typically has a convex contour or profile facing toward the lower half 26 of the die 20. Thus, during the forming process, as the punch 44 travels toward the lower half 26 of the die 20, the punch 44 forms the U-shaped torsion section 66 in the tubular twist beam part 22. Alternatively, the punch 44 can comprise various other contours, profiles, or geometries, and the torsion section 66 of the tubular twist beam part 22 may comprise another shape.

Figure 8:
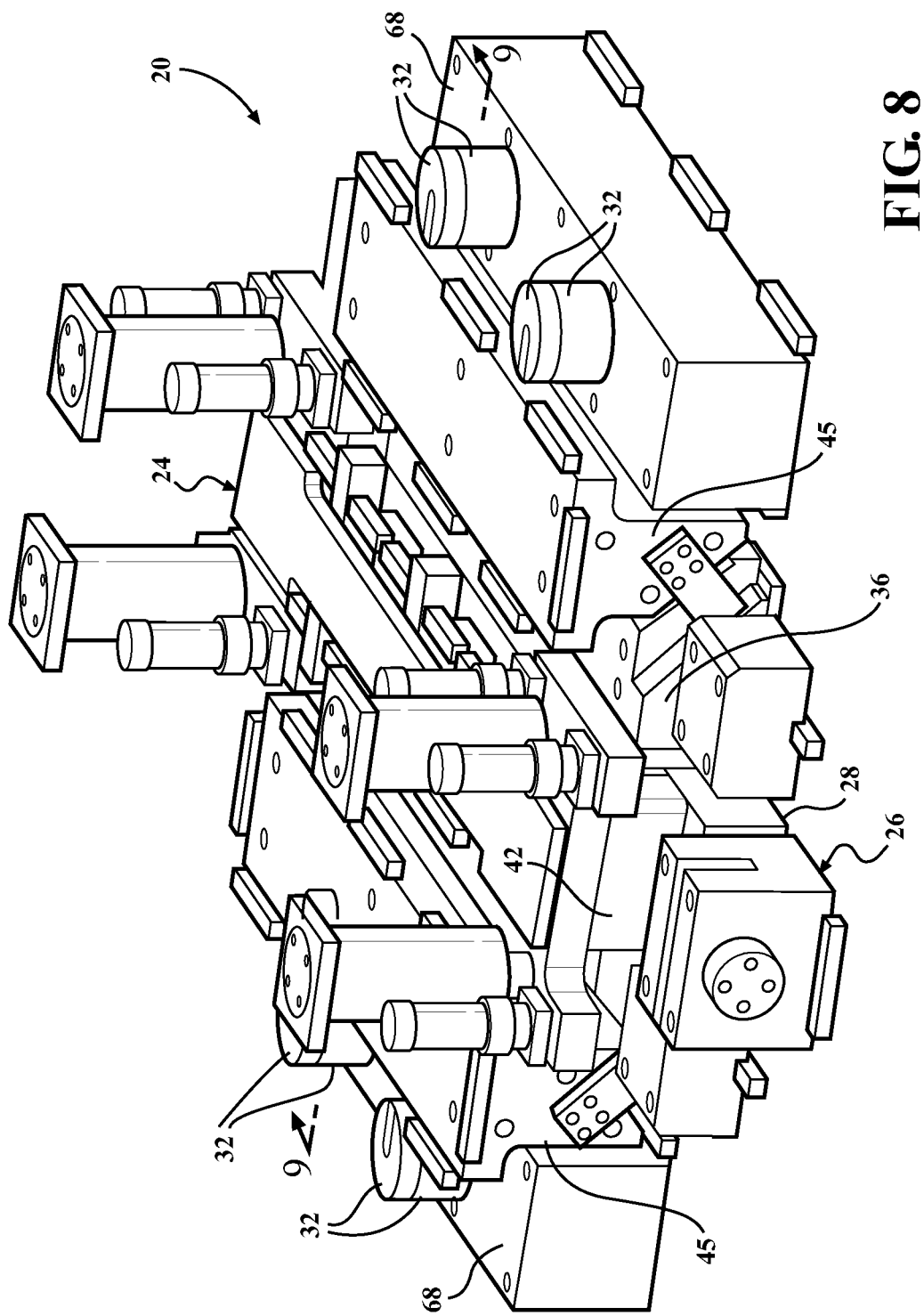
FIG. 8 illustrates the adjustable die in the closed position according an embodiment of the invention.
Figure 9:
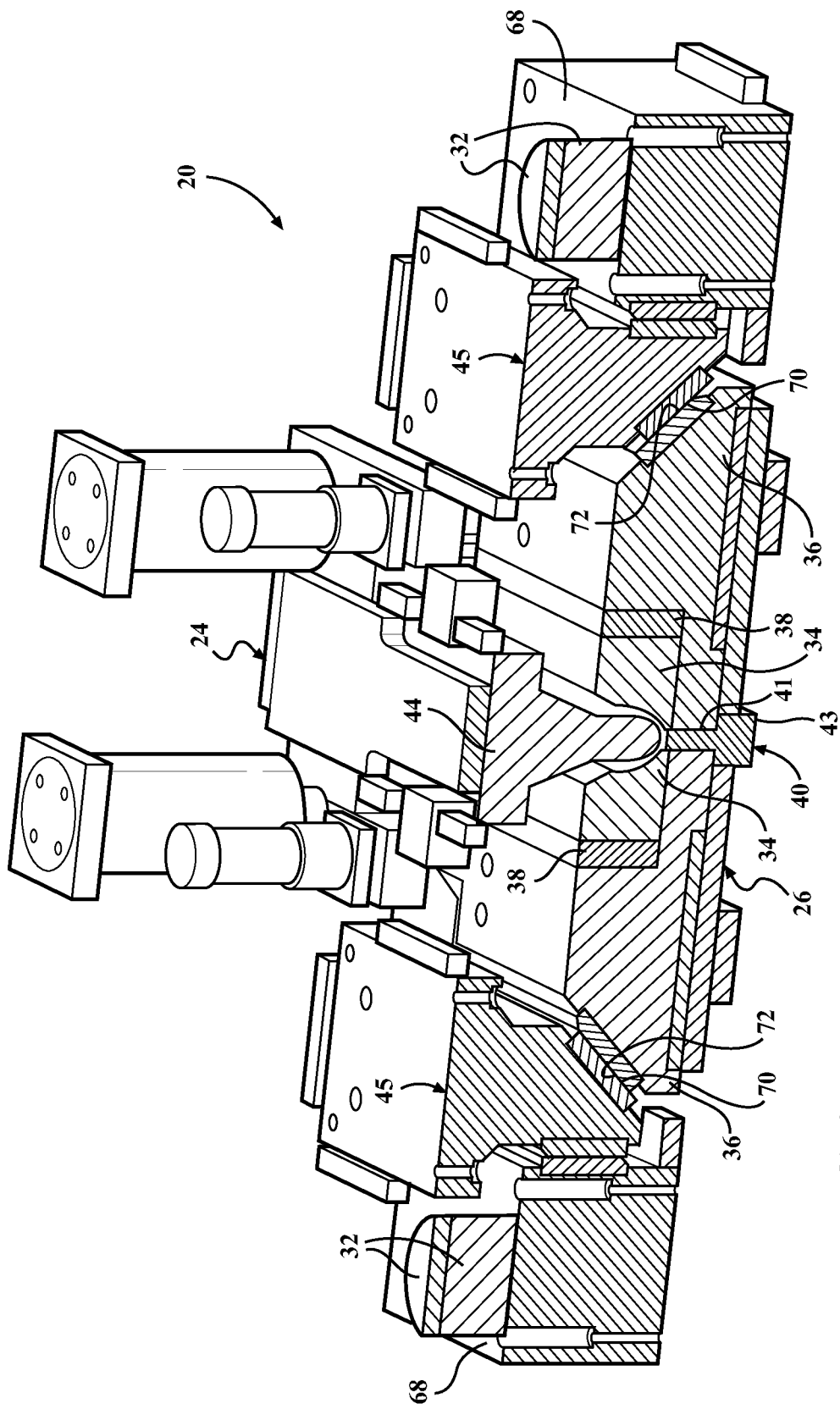
FIG. 9 is a cross-sectional view of the die of FIG. 8.

The upper half 24 also includes a pair of cam drivers 45 disposed on opposite sides of the punch 44, as shown in FIGS. 8 and 9. The cam drivers 45 and the punch 44 are connected to the same plate (not shown) and thus move together simultaneously toward and away from the lower half 26 during the forming process. The punch 44 and the cam drivers 45 typically travel with the motion of a press ram. As shown in FIG. 9, each cam driver 45 presents a first wedge surface 70 angled inwardly and downwardly toward the lower half 26, and each of the side cams 36 include a second wedge surface 72 vertically aligned with the first wedge surfaces 70 and disposed at the same angles. When the upper half 24 moves toward the lower half 26 to close the die 20, the first wedge surfaces 70 of the cam drivers 45 engage and push the second wedge surfaces 72 of the side cams 36 inwardly toward the form blocks 34. The form blocks 34 then move toward one another and engage the metal tube to form the tubular twist beam part 22 from the side.

The form blocks 34 of the lower half 26 of the die 20 are horizontally aligned with one another and disposed on opposite sides of the punch 44. One of the form blocks 34 and one of the side cams 36 is disposed on each side of the punch 44. The side cams 36 may be disposed outwardly of and below the form blocks 34 to support the form blocks 34, as shown in FIG. 9. In addition, the inside edges of the side cams 36 can be aligned with the inside edges of the form blocks 34 to prevent or minimize a "knife edge" condition along the edges of the form blocks 34.

The form blocks 34 present a space therebetween, which is directly below the punch 44. During the forming process, the form blocks 34 preferably move toward one another at the same time the punch 44 moves toward the metal tube. The punch 44 typically begins to engage the top of the metal tube before the form blocks 34 begin to engage the metal tube. However, for a period of time, the punch 44 and form blocks 34 press the metal tube simultaneously and form the tubular twist beam part 22.

Like the punch 44, the profile of the form blocks 34 is designed to achieve a desired contour or profile along the tubular twist beam part 22. The form blocks 34 can be machined to various different dimension and profiles, depending on the desired geometry of the tubular twist beam part 22. For example, each form block 34 can include a curved profile facing the other form block 34 with a protrusion adjacent to each end, which forms an indentation 74 on the side of the tubular twist beam part 22, as shown in FIG. 2.

The vertical spacer blocks 32 are disposed on a support surface 68 of the upper half 24, lower half 26, or both the upper half 24 and lower half 26 of the die 20, and outwardly of the cam drivers 45 and side cams 36. The vertical spacer blocks 32 restrict the distance the punch 44 moves toward to the lower half 26, and can be used in dies 20 of various different configurations. Examples of the vertical spacer blocks 32 are shown in FIGS. 3, 4, 8 and 10. If both the upper half 24 and lower half 26 of the die 20 include the vertical spacer blocks 32, then the vertical spacer blocks 32 are axially aligned with one another and engage one another when the die 20 is closed, as shown in FIG. 8. In FIG. 8, four of the vertical spacer blocks 32 are connected to the plate (not shown) of the upper half 24 and four of the vertical spacer blocks 32 are connected to the support surface 68 of the lower half 26.

The vertical spacer blocks 32 typically comprise a generally cylindrical or rectangular shape extending from the support surface 68 to a planar surface. However, the vertical spacer blocks 32 can have various different heights or dimensions, depending on the desired thickness and dimensions of the finished tubular twist beam part 22. There is a linear relationship between the thickness of the part 22 and the roll rate of the part 22. The vertical spacer blocks 32 are easily removed from the upper half 24 and lower half 26 and replaced with vertical spacer blocks 32 of different heights or dimensions to adjust the thickness or dimensions, and thus the roll rate, of the tubular twist beam part 22. For example, the vertical spacer blocks 32 shown in FIG. 8 may be replaced by shorter vertical spacer blocks 32 to reduce the thickness and thus the roll rate of the tubular twist beam part 22. Accordingly, the same punch 44 can be used to form parts 22 having different roll rates by changing the vertical spacer blocks 32.

The lower half 26 of the die 20 also includes one of the horizontal spacer blocks 38 bolted or otherwise connected to each side cam 36 and engaging the adjacent form block 34. The horizontal spacer blocks 38 restrict the distance the form blocks 34 move toward the metal tube, the amount of pressing or pinching of the metal tube, and thus the width or dimensions and roll rate of the finished tubular twist beam part 22. An example of the horizontal spacer blocks 38 is shown in FIGS. 8 and 9, wherein each horizontal spacer block 38 presents rectangular shaped planar surfaces. One planar surface engages the form block 34 and the other planar surface engages the side cam 36. The horizontal spacer blocks 38 can also be used in dies 20 having various different dimensions. The horizontal spacer blocks 38 can be easily removed and replaced with horizontal spacer blocks 38 of different widths or dimensions to adjust the width or dimensions of the tubular twist beam part 22. There is a linear relationship between the width of the part 22 and the roll rate of the part 22. For example, the horizontal spacer blocks 38 shown in FIGS. 8 and 9 may be replaced with narrower horizontal spacer blocks 38 to reduce the width of the tubular twist beam part 22 and thus the roll rate. Accordingly, the same form block 34 can be used to form parts 22 having different roll rates by changing the horizontal spacer blocks 38.

The lower half 26 of the die 20 also includes a bottom plate 40 disposed in the space between the side cams 36, directly below the punch 44. During the forming process, the bottom plate 40 contacts and supports the bottom of the metal tube. An example of the bottom plate 40 is shown in FIG. 9. The bottom plate 40 may include a projection 41 extending upwardly from a base 43, as shown in FIG. 9. In one embodiment, the projection 41 may present a flat surface being to 2 to 5 mm wide to support the metal tube. The flat surface may be more pronounced in higher tonnage presses. The base 43 of the bottom plate 40 may also include a large surface area disposed below the side cams 36 for the side cams 36 to ride on. A wear plate (not shown) formed of aluminum, bronze, or hardened steel may be bolted onto the base 43 to prevent binding of the side cams 36 to the base 43.

The die 20 of the present invention provides several advantages over those of the prior art. The die 20 is capable of forming multiple tubular twist beam parts 22 each having a different dimension and a different roll rate. The die 20 is also capable of quickly and conveniently tuning the roll rate of a tubular twist beam part 22 in production. The spacer blocks 32, 38 can be replaced with spacer blocks 32, 38 having different dimensions to adjust the roll rate. Accordingly, there is no need to design a new die when a new roll rate is needed. Further, the die 20 is capable of forming a metal tube into a tubular twist beam part 22 with only one press stroke, and does not require additional forming tools or steps.

The invention also provides a method of forming a plurality of tubular twist beam parts 22 having various different dimensions using the adjustable die 20 with vertical spacer blocks 23, horizontal spacer blocks 38, or both. According to one embodiment, wherein the die 20 includes the vertical spacer blocks 32, the method includes disposing a first metal tube between the lower cassettes 28. The opposite ends of the metal tube can be disposed on the lower cassettes 28 with the mandrels 30, or the mandrels 30 supporting the ends of the metal tube can be disposed on the lower cassettes 28 while the ends of the metal tube are disposed between the lower cassettes 28. The method next includes moving the upper half 24 toward the lower half 26 to engage the first metal tube with the punch 44 and form a first tubular twist beam part 22. During this moving step, the vertical spacer blocks 32 restrict movement of the upper half 24 toward the lower half 26. The method also includes moving the side cams 36 toward one another while moving the upper half 24 toward the lower half 26, and engaging the first metal tube with the form blocks 34 while engaging the first metal tube with the punch 44.

The punch 44 and form blocks 34 typically move toward one another at the same time, and simultaneously engage the metal tube, although the punch 44 typically begins to engage the metal tube before the form blocks 34 begin to engage the metal tube. Alternatively, the punch 44 and form blocks 34 move toward one another and engage the metal tube at different times. After forming the first tubular twist beam part 22, the method includes replacing the vertical spacer blocks 32 with vertical spacer blocks 32 having a different dimension. The method next includes disposing a second metal tube on the lower cassettes 28; and moving the upper half 24 toward the lower half 26 and engaging the second metal tube with the punch 44 to form a second tubular twist beam part 22 having a dimension different from the first tubular twist beam part 22. These steps can be repeated to form multiple tubular twist beam parts 22 having various different dimensions.

According to another embodiment, wherein the die 20 includes the horizontal spacer blocks 38, the method comprises disposing a first metal tube on the lower cassettes 28, wherein opposite ends of the first metal tube are disposed on the lower cassettes 28. The method next includes moving the upper half 24 toward the lower half 26 and engaging the first metal tube with the punch 44. The method also includes moving the side cams 36 toward one another and engaging the first metal tube with the form blocks 34 to form a first tubular twist beam part 22, wherein the horizontal spacer blocks 38 restrict movement of the side cams 36 toward one another. After forming the first tubular twist beam part 22, the method includes replacing the horizontal spacer blocks 38 with horizontal spacer blocks 38 having a different dimension. The method next includes disposing a second metal tube on the lower cassettes 28; and moving the upper half 24 toward the lower half 26 and engaging the second metal tube with the punch 22 to form a second tubular twist beam part 22 having a dimension different from the first tubular twist beam part 22. These steps can be repeated to form multiple tubular twist beam parts 22 having various different dimensions.

Obviously, many modifications and variations of the present invention are possible in light of the above teachings and may be practiced otherwise than as specifically described while being within the scope of the claims.

The invention claimed is:

1. An adjustable die for manufacturing tubular twist beam parts, comprising:
    an upper half including a punch extending between opposite ends and having a convex profile for engaging a metal tube;
    said upper half including a pair of upper cassettes, each upper cassette providing a groove and being disposed along one end of said punch, said grooves of said upper cassettes being axially aligned with one another;
    a lower half including a pair of lower cassettes vertically aligned with said upper cassettes, each lower cassette providing a groove, said grooves of said lower cassettes being axially aligned with one another and facing said grooves of said upper cassettes;
    said lower half including a pair of form blocks being disposed on opposite sides of said punch for moving toward one another and engaging opposite sides of the metal tube;
    said lower half including a pair of side cams; said side cams being disposed on opposite sides of said form blocks and outwardly of said form blocks for pressing said form blocks toward one another and the metal tube;
    at least one of a vertical spacer block and a pair of horizontal spacer blocks, wherein said vertical spacer block extends between said upper half and said lower half for restricting movement of said upper half toward said lower half and each of said horizontal spacer blocks are disposed between one of said lower cassettes and the adjacent form block for restricting movement of the adjacent side cam toward said form block; and
    wherein said at least one of said vertical spacer block and said pair of horizontal spacer blocks are removable and replaceable with a vertical spacer block and a pair of horizontal spacer blocks of a different dimension; and
    wherein said upper half includes a pair of cam drivers, said cam drivers are disposed on opposite sides of said punch, each of said cam drivers presents a first wedge surface angled inwardly and downwardly toward said lower half; each of said side cams includes a second wedge surface facing said first wedge surfaces, said second wedge surfaces are disposed at the same angle as said first wedge surfaces, and said first wedge surfaces engage and push said second wedge surfaces inwardly toward said form blocks when said upper half moves toward said lower half.

2. The adjustable die of claim 1, wherein said vertical spacer blocks are attached to said lower half and extend upwardly toward said upper half for engaging said upper half and restricting movement of said upper half toward said lower half.

3. The adjustable die of claim 1, wherein said vertical spacer blocks are attached to said upper half and extend downwardly toward said lower half for engaging said lower half and restricting movement of said upper half toward said lower half.

4. The adjustable die of claim 1, wherein said vertical spacer block and said horizontal spacer block have dimensions depending on dimensions of the tubular twist beam part to be formed.

5. The adjustable die of claim 1, wherein said form blocks have a curved profile and face one another.

6. The adjustable die of claim 1, wherein said vertical spacer block includes an upper portion connected to said upper half and a lower portion connected to said lower half, and said upper portion and said lower portion being aligned with one another and engaging one another when said upper half moves toward said lower half.

7. The adjustable die of claim 1 including a pair of mandrels having a hollow interior, each mandrel being disposed on one of said lower cassettes for being inserted into the ends of the metal tube and preventing the ends of the metal tube from collapsing when said punch engages the metal tube.

\* \* \* \* \*